(12) United States Patent
Starkey et al.

(10) Patent No.: US 11,301,973 B2
(45) Date of Patent: Apr. 12, 2022

(54) TONE MAPPING METHOD

(71) Applicants: Arm Limited, Cambridge (GB); Apical Limited, Cambridge (GB)

(72) Inventors: Brian Paul Starkey, Cambridge (GB); Damian Piotr Modrzyk, Katowice (PL); Güney Kayim, Nottingham (GB); Lukas Krasula, Campbell, CA (US)

(73) Assignees: Arm Limited, Cambridge (GB); Apical Limited, Cambridge (GB)

( * ) Notice: Subject to any disclaimer, the term of this patent is extended or adjusted under 35 U.S.C. 154(b) by 255 days.

(21) Appl. No.: 16/834,847

(22) Filed: Mar. 30, 2020

(65) Prior Publication Data
US 2021/0304374 A1    Sep. 30, 2021

(51) Int. Cl.
*G06T 5/00*   (2006.01)
*G06T 5/20*   (2006.01)
*G06T 1/60*   (2006.01)

(52) U.S. Cl.
CPC ............... *G06T 5/009* (2013.01); *G06T 1/60* (2013.01); *G06T 5/20* (2013.01); *G06T 2207/20208* (2013.01)

(58) Field of Classification Search
None
See application file for complete search history.

(56) References Cited

U.S. PATENT DOCUMENTS

| | | | |
|---|---|---|---|
| 7,068,396 B1 * | 6/2006 | Gallagher | H04N 5/35563 348/E3.018 |
| 8,237,730 B1 * | 8/2012 | Anderson | G06T 15/50 345/589 |

(Continued)

OTHER PUBLICATIONS

Eilertsen, Gabriel. The high dynamic range imaging pipeline. vol. 1939. Linköping University Electronic Press, 2018. (Year: 2018).*

(Continued)

*Primary Examiner* — Andrae S Allison
(74) *Attorney, Agent, or Firm* — EIP US LLP

(57) ABSTRACT

A method of performing tone mapping in a stream of images $(Fr_{1 \ldots N})$ includes, for each image $(Fr_N)$ in the stream: sparsely reading image data values $(ID_N)$ corresponding to the image $(Fr_N)$ to provide sparse image data from a plurality of sparsely distributed positions $(Pos_{1 \ldots k})$ in the image $(Fr_N)$; generating, based on the sparse image data, tone mapping parameters of a tone mapping algorithm (TMA) for each position in the image $(Fr_N)$; each position in the image $(Fr_N)$ including the sparsely distributed positions $(Pos_{1 \ldots k})$ and a plurality of further positions $(PosF_{1 \ldots j})$ in the image $(Fr_N)$; reading the image data values $(ID_N)$ corresponding to the image $(Fr_N)$ to provide image data from each position in the image $(Fr_N)$; and tone mapping the image by mapping the image data from each position in the image $(Fr_N)$ to adjusted image data using the generated tone mapping parameters.

15 Claims, 2 Drawing Sheets

(56) References Cited

U.S. PATENT DOCUMENTS

| | | | |
|---|---|---|---|
| 8,737,736 B2* | 5/2014 | Liu | G06T 5/50 |
| | | | 382/169 |
| 9,336,578 B2* | 5/2016 | Wang | G06T 5/009 |
| 10,009,613 B2* | 6/2018 | Seifi | H04N 19/172 |
| 10,877,750 B1* | 12/2020 | Connolly | H04L 9/0897 |
| 2018/0097992 A1* | 4/2018 | Douady-Pleven | H04N 9/646 |
| 2018/0262767 A1* | 9/2018 | Messmer | H04N 21/440227 |
| 2019/0349558 A1* | 11/2019 | Modrzyk | G06F 3/0659 |

OTHER PUBLICATIONS

Duan et al, Tone-mapping high dynamic range images by novel histogram adjustment, Pattern Recognition43 (2010) 1847-1862 (Year: 2010).*

* cited by examiner

TONE MAPPING METHOD

BACKGROUND OF THE INVENTION

Field of the Invention

The present disclosure relates to image processing and more particularly to tone mapping. The present disclosure finds application in tone mapping in a stream of images.

Description of the Related Technology

Tone mapping is an image processing technique that is used to map the colours of one (input) image to the colours of another (output) image.

Tone mapping is sometimes used to cater for differing dynamic ranges of image-handling media. For example, the light-sensitive pixels of a camera may generate a set of intensities within a certain dynamic range. Other types of image-handling media such as a display or a printer may have a different dynamic range. Tone mapping may be used to convert the image intensities between these differing dynamic ranges so that they make appropriate use thereof. One common tone mapping algorithm compresses low and high input intensity ranges by mapping them respectively to output intensity ranges that are relatively narrow whilst mapping a range of intermediate input intensities to a relatively broad range of output intensities. A few examples of dynamic ranges include High Dynamic Range "HDR", Standard Dynamic Range "SDR", and Low Dynamic Range "LDR".

Tone mapping may additionally or alternatively be used to provide a particular visual effect. A more aesthetically pleasing image may for instance be provided by adjusting the colours of skin tones in particular.

Images may be encoded in a wide variety of colour models. One common colour model is the RGB colour model that defines each pixel in an image in terms of the intensities of each of red, green and blue sub-pixels. Another common colour model is the YUV colour model that defines each pixel in an image in terms of its luma, Y, and two chrominance components: U, for blue projection and V for red projection. Luma represents brightness, or intensity. The colour models YUV, YCbCr, and YPbPr also represent pixels in terms of luma and chrominance components and are also often used to encode colour images.

In general, tone mapping may therefore involve adjusting the intensity and/or chrominance of the pixels or sub-pixels in an image.

Tone mapping techniques are often separated into two approaches: global, and local. Global tone mapping involves applying the same mapping algorithm to every pixel in an image. Examples of global tone mapping algorithms include $I_{out}=I_{in}/(I_{in}+1)$, and $L_{out}=A \cdot L_{in}^{\gamma}$ wherein $A>0$ and $0<\gamma<1$, and wherein $I_{in}$ and $I_{out}$ are the input and output intensity input values for each pixel respectively. Some global tone mapping algorithms suffer from poor contrast reproduction, resulting in the sub-optimal display of highlights and shadows. By contrast, local tone mapping involves mapping each pixel with an algorithm that varies spatially depending on the intensities of its neighbouring pixels. Local tone mapping algorithms typically exploit information about local changes in intensity in order to improve image quality.

A wide variety of image processing techniques exploiting the above tone mapping principles may be used to process static images to great effect. However the processing of images in an image stream suffers from additional challenges. In particular, when performing tone mapping in an image stream, suitably tone-mapped images should have minimal image artefacts and avoid interruptions to the image stream.

One technique for performing tone mapping in an image stream involves extracting local tone mapping parameters from one image, N, in the stream and applying these parameters to the subsequent image, N+1, in the stream. Such pre-processing of the local tone mapping parameters relaxes the processing requirements of determining tone mapping parameters but may introduce image artefacts, particularly when the image content changes significantly between consecutive images.

Another technique for performing tone mapping for an image stream is described in document US 2019/349558 A1. This document describes the use of a producer processing unit, such as a video decoder, of a media processing system for producing a data output for use by a consumer processing unit, such as a display processor. The producer processing unit also generates metadata for the data output that it is producing and provides that metadata for use by the consumer processing unit. The consumer processing unit then uses the metadata provided by the producer processing unit when processing the data output to which the metadata relates. In one embodiment described in this document, the metadata relates to data values (e.g. colour values) within the data output. This may be used, e.g., for ambient colour enhancement of a displayed image. It is disclosed that such metadata can be used to control, for example, tone strength via a global or local tone mapping algorithm in a display processor, and/or used to detect changes in a video stream, for example.

In spite of these developments, there remains room to provide improved techniques for tone mapping in an image stream.

SUMMARY

According to a first aspect of the present disclosure, there is provided a method of performing tone mapping in a stream of images. The method includes, for each image in the stream:

sparsely reading image data values corresponding to the image to provide sparse image data from a plurality of sparsely distributed positions in the image;

generating, based on the sparse image data, tone mapping parameters of a tone mapping algorithm for each position in the image; each position in the image including the sparsely distributed positions and a plurality of further positions in the image;

reading the image data values corresponding to the image to provide image data from each position in the image; and tone mapping the image by mapping the image data from each position in the image to adjusted image data using the generated tone mapping parameters.

According to a second aspect of the present disclosure, the image is divided into zones. In this aspect of the present disclosure the step of: generating, based on the sparse image data, tone mapping parameters of a tone mapping algorithm for each position in the image, comprises:

dividing the image into a plurality of zones; and for each zone, using the sparse image data from the one or more sparsely distributed positions within the zone to generate common tone mapping parameters of the tone mapping algorithm for the sparsely distributed positions and the further positions within the zone.

According to a third aspect of the present disclosure, the image data values are sparsely read during a vertical blanking interval. In this aspect of the present disclosure the method of the first aspect further includes:

- generating display line update signals for displaying the image; and
- a time period between generating display line update signals for a last line of an image in the stream and generating display line update signals for a first line of a subsequent image in the stream defines a vertical blanking interval;
- and wherein: sparsely reading image data values corresponding to the image to provide sparse image data from a plurality of sparsely distributed positions in the image, is performed for the image during the vertical blanking interval that precedes: generating display line update signals for displaying the image.

A related system and computer program product are also disclosed. It is to be appreciated that features disclosed in relation to the method may also be used in the system and in the computer program product, and that for the sake of brevity such features are not necessarily duplicated for the system and the computer program product.

Further features and advantages of the present disclosure will become apparent from the following description of preferred embodiments, given by way of example only, which is made with reference to the accompanying drawings.

DETAILED DESCRIPTION OF CERTAIN INVENTIVE EMBODIMENTS

The present disclosure relates to a method of performing tone mapping in a stream of images. The method tone maps each image in the stream by mapping image data representing each image to adjusted image data. The stream of images may be provided by a memory in the form of digital data, and the adjusted image data may likewise be generated in the form of digital data. The method may be used to tone map image data that is encoded in a variety of colour spaces, including for example RGB, YUV, Y'U'V', YCbCr, and YPbPr. The image data from each image in the stream may have a dynamic range that is the same as, or different to, a dynamic range of the adjusted image data. For example the image data from each image in the stream may be HDR image data, and the dynamic range of the adjusted image data may be HDR image data or LDR image data. In other examples the image data from each image in the stream may be LDR image data, and the dynamic range of the adjusted image data may be LDR image data or HDR image data.

The present disclosure may in general be implemented within an image processing chain wherein images generated by an input modality are processed prior to being displayed on an output modality. The input modality may be any form of imaging device, including and without limitation: an optical camera, a thermal imaging camera, a medical imaging system and an imaging scanner. The images may therefore be generated by any form of optical sensor such as a charge coupled device "CCD", a complementary metal oxide semiconductor "CMOS", or a pyroelectric sensor. The output modality may be any modality capable of generating an image, including for example a display, a projector and a printer. Suitable displays include, without limitation, a liquid crystal "LCD", organic light emitting diode "OLED", electrophoretic and electrowetting display.

As is described in more detail below, the method of the present disclosure may be implemented by a computer. The computer may include a processor and a memory that includes instructions which when executed by the processor cause to processor to carry out the method. The present disclosure therefore finds application in the image processing chain within a range of systems and devices, including, for example and without limitation: a camera, a (portable) computing device, a (mobile) telephone, a display, for example a display controller, a television, a monitor, a projector, a chip set, a set top box, a games console, a vehicle, and so forth.

Figure 1:
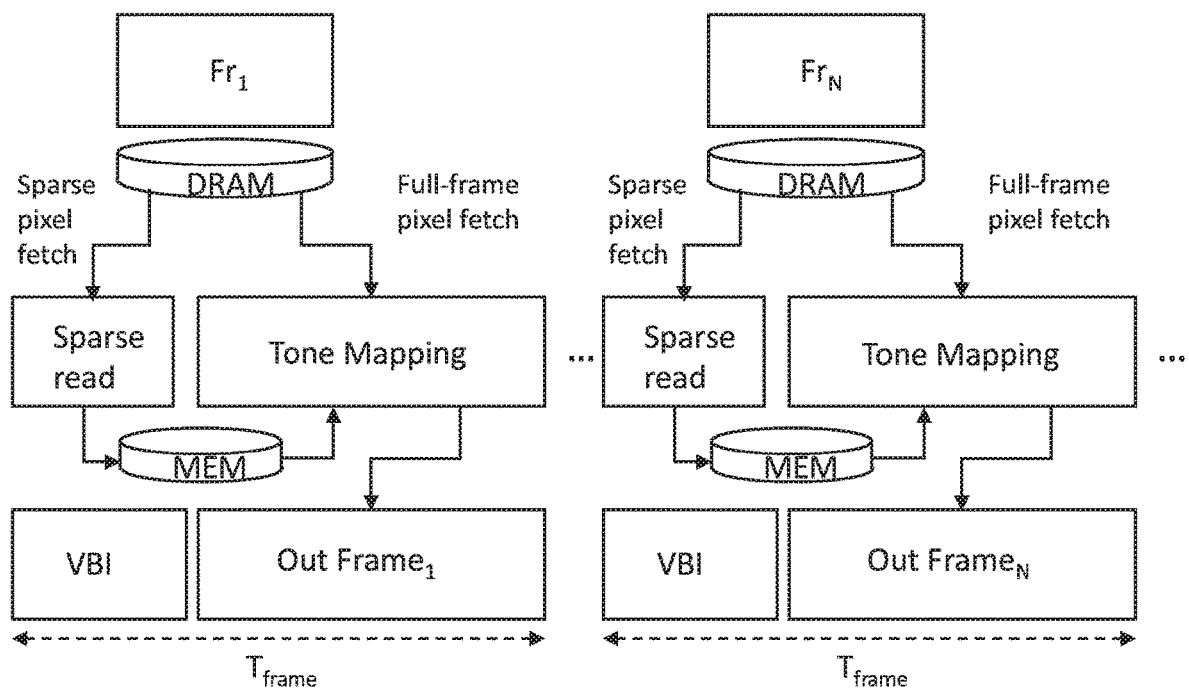
FIG. 1 illustrates a method of performing tone mapping in a stream of images $Fr_{1 \ldots N}$ in accordance with some aspects of the present disclosure.

Thereto, FIG. 1 illustrates a method of performing tone mapping in a stream of images $Fr_{1 \ldots N}$ in accordance with some aspects of the present disclosure. With reference to FIG. 1, a method of performing tone mapping in a stream of images $Fr_{1 \ldots N}$ includes, for each image $Fr_N$ in the stream:

- sparsely reading image data values $ID_N$ corresponding to the image $Fr_N$ to provide sparse image data from a plurality of sparsely distributed positions $Pos_{1 \ldots k}$ in the image $Fr_N$;
- generating, based on the sparse image data, tone mapping parameters of a tone mapping algorithm TMA for each position in the image $Fr_N$; each position in the image $Fr_N$ including the sparsely distributed positions $Pos_{1 \ldots k}$ and a plurality of further positions $PosF_{1 \ldots j}$ in the image $Fr_N$;
- reading the image data values $ID_N$ corresponding to the image $Fr_N$ to provide image data from each position in the image $Fr_N$; and
- tone mapping the image by mapping the image data from each position in the image $Fr_N$ to adjusted image data using the generated tone mapping parameters.

In these aspects of the present disclosure the step of sparsely reading image data values can be performed quickly. The step of generating the tone mapping parameters of the tone mapping algorithm for each position in the image based on the sparse image data can also be performed quickly. Consequently, the method may provide tone mapping with relaxed processing requirements.

In FIG. 1, example images $Fr_1$ and $Fr_N$ represent images in a stream of images. In general terms, the images may be video images. Stream of images $Fr_{1 \ldots N}$ may for instance be a sequence of colour or monochrome images. In some implementations the stream of images may be live images; i.e. quasi real-time images that are read within a short delay of their generation. In other implementations the stream of images may have been previously recorded. In some implementations the stream of images may be received from a local input modality, e.g. from a locally-connected camera, or a local memory such as e.g. an optical or magnetic or other type of disc and so forth, whilst in other implementations the stream of images may be received from a remote location, such as e.g. via a cable delivery platform, via a broadcast delivery platform, via a satellite television platform, or via the internet or the "cloud". The stream of images may for instance be received via an over-the-top "OTT" media service—i.e. a streaming media service offered directly to viewers via the internet. In general, in both the above reading steps, image data values are read from a memory. The memory may for instance be a short term memory such as a buffer, or a long term memory such as a hard disk drive. In FIG. 1 the image data values for the images in stream of images $Fr_{1...N}$ is read from an example memory in the form of Dynamic Random Access Memory "DRAM". It is however to be appreciated that other types of memory; i.e. a computer-readable storage medium, may alternatively provide the image data values. Some non-limiting examples include CPU cache, Random Access Memory "RAM", and Static RAM "SRAM".

The image data values that are read during the Sparse read step in FIG. 1 may in general terms correspond to an intensity value and/or a chrominance value of a pixel or one or more sub-pixels in the image. A monochrome image may be encoded in terms of the intensity of each of its pixels, these being a single colour, or white. A colour image may be encoded in terms of the intensities of a number of differently-coloured sub-pixels. For instance, the RGB colour space may be used to describe each pixel in an image in terms of the intensities of each of a red sub-pixel, a green sub-pixel and a blue sub-pixel that define each pixel. The RGB-W colour space additionally includes a white sub-pixel and may be described in a similar manner. Sub-pixels such as yellow and cyan may also be included in each pixel. In these implementations the image data values that are sparsely read may include pixel or sub-pixel intensity values of one or more colours. In more detail, each pixel $Px_{1...M}$ in an image may include at least one of: a red sub-pixel having a red sub-pixel intensity value, a green sub-pixel having a green sub-pixel intensity value, a blue sub-pixel having a blue sub-pixel intensity value, a white sub-pixel having a white sub-pixel intensity value, a cyan sub-pixel having a cyan sub-pixel intensity value, a yellow sub-pixel having a yellow sub-pixel intensity value. The image data values that are read during a Sparse read operation for an RGB colour space representation may for instance include the sub-pixel intensities of each of the red, green and blue colours that are encoded; these values being read only for sparsely distributed positions in the image.

Image data values that are encoded in other colour spaces than RGB may also be read in a similar manner. For instance the YUV colour space defines each pixel in an image in terms of its luma, Y, and two chrominance components: U, for blue projection and V for red projection. Luma represents brightness, or intensity. The colour spaces Y'U'V', YCbCr, and YPbPr, may likewise be used to encode colour images. The image data values that are read during a Sparse read operation for a YUV colour space representation may therefore include the brightness, i.e. intensity, and/or the chrominance values for each pixel; these values being read only for sparsely distributed positions in the image during the sparse read step.

Thus, in general terms, the image data values that are read during the Sparse read step may correspond to an intensity value and/or a chrominance value of a pixel or one or more sub-pixels in the image.

With reference to FIG. 1, the step entitled "Sparse read" represents the method step of: sparsely reading image data values $ID_N$ corresponding to the image $Fr_N$ to provide sparse image data from a plurality of sparsely distributed positions $Pos_{1...k}$ in the image $Fr_N$. This step provides a portion of the image data for each image $Fr_N$ and not all the image data for the image $Fr_N$. Put another way, the sparse image data provided by this step represents a proper subset of the image data of each image $Fr_N$. For example, less than or equal to: approximately 50%, or approximately 10%, or approximately 5%, or approximately 1%, of the image data of each image may be provided. The image data values may be read from a memory, as described above. This sparse read step takes less time than reading all the image data values for each image.

As indicated by the arrow between Sparse read and memory MEM in FIG. 1, the aforementioned Sparse read step may further include storing the sparse image data to a memory. The memory may for example be a dynamic random access memory "DRAM", or a buffer.

Figure 2:
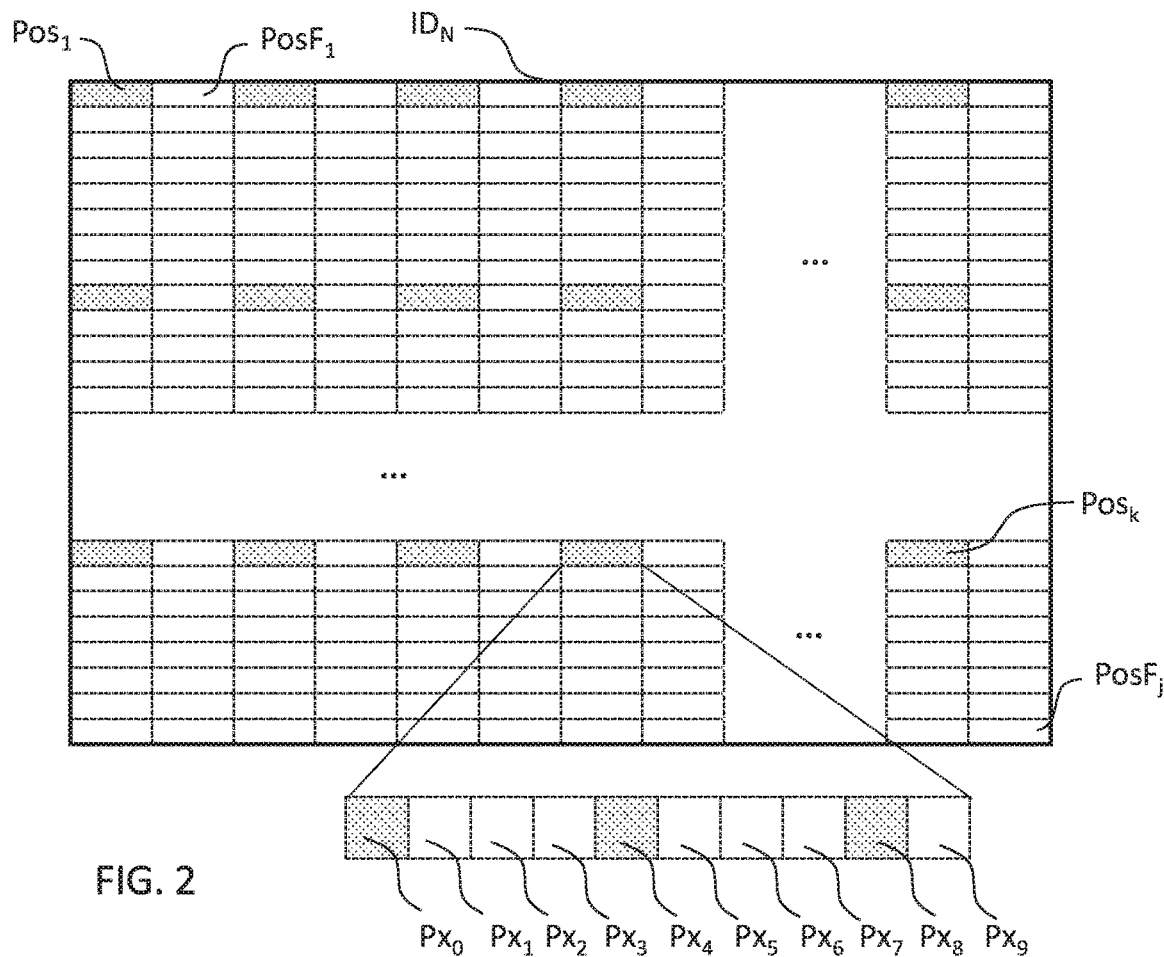
FIG. 2 illustrates the sparse reading of image data $ID_N$ corresponding to an image $Fr_N$ at sparsely distributed positions $Pos_{1 \ldots k}$.

The aforementioned Sparse read step is also illustrated with reference to FIG. 2, which illustrates the sparse reading of image data $ID_N$ corresponding to an image $Fr_N$ at sparsely distributed positions $Pos_{1...k}$. As mentioned above, images typically comprise pixels; a pixel representing the smallest controllable element of an image. The image data $ID_N$ in FIG. 2 is illustrated in the layout of an image wherein each of sparsely-distributed positions $Pos_{1...k}$ include pixels $Px_{0...9}$. During the sparse read step, sparse image data is read only for the example shaded pixels $Px_0$, $Px_4$, $Px_8$ at each of the sparsely distributed positions $Pos_{1...k}$. The complement of the image data $ID_N$ for each image; i.e. that in the non-shaded areas, is not read during the sparse read.

In general therefore, each image $Fr_N$ in the stream of images $Fr_{1...N}$ may include a plurality of pixels $Px_{1...M}$; and each position in the image may comprises a single pixel or a group of pixels. The image data values $ID_N$ that are read during a sparse read step may therefore correspond to intensity values and/or chrominance values of the one or more pixels at each sparsely-distributed position $Pos_{1...k}$.

Further signal processing may optionally also be applied to the sparse image data. For instance, the step of: sparsely reading image data values $ID_N$ corresponding to the image $Fr_N$ to provide sparse image data from a plurality of sparsely distributed positions $Pos_{1...k}$ in the image $Fr_N$ may optionally further include filtering the sparse image data. The filtering may include computing a weighted average of the sparse image data at each of the sparsely distributed positions $Pos_{1...k}$. When the image is represented by pixels $Px_{1...M}$ and each of the pixels includes a plurality of sub-pixels, each sub-pixel having a sub-pixel intensity value; the intensity value at each position in the image $Fr_N$ may comprise a weighted average of the plurality of sub-pixel intensity values at said position. With reference to FIG. 2, the pixels $Px_{0...9}$ at each sparsely-distributed position in FIG. 2 may for example each have a sub-pixel with an intensity value. The weighted average of the sparse image data at each of the sparsely distributed positions $Pos_{1...k}$ may therefore be determined from sub-pixels of each of pixels $Px_0$, $Px_4$ and $Px_8$.

With continued reference to FIG. 2, the pixels at each sparsely distributed position may be arranged in a pattern. One example pattern is the line of non-contiguous pixels $Px_{0...9}$ in FIG. 1. Other patterns may alternatively be used such as, and without limitation, concentric shapes, stripes and so forth. A group of pixels at any sparsely distributed position $Pos_{1...k}$ may optionally fill a predetermined shape without gaps, or it may include gaps such as in a checkerboard pattern. In some instances the sparse image intensity data from adjacent sparsely distributed positions in the image corresponds to non-overlapping regions in the image. In other instances the sparse image intensity data from adjacent sparsely distributed positions in the image corresponds to overlapping regions in the image. Adjacent sparsely distributed positions may optionally include common pixels.

Figure 3:
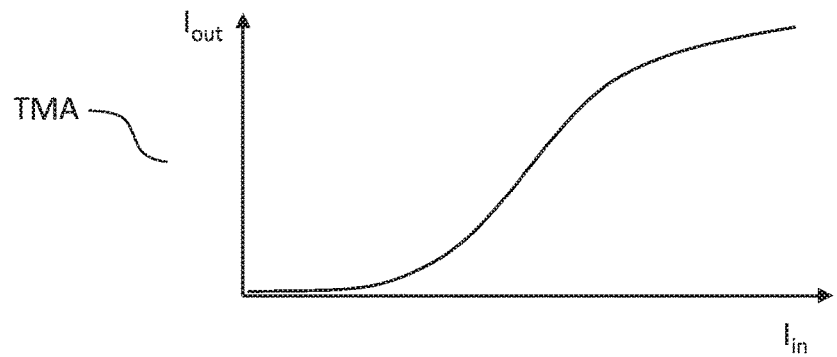
FIG. 3 illustrates a simplified tone mapping algorithm TMA wherein input intensities $I_{in}$ are mapped to output intensities $I_{out}$.

Various techniques may be employed in the above step of: generating, based on the sparse image data, tone mapping parameters of a tone mapping algorithm TMA for each position in the image $Fr_N$; each position in the image $Fr_N$ including the sparsely distributed positions $Pos_{1\ldots k}$ and a plurality of further positions $PosF_{1\ldots j}$ in the image $Fr_N$. In general, a tone mapping algorithm provides a relationship between an input colour space and an output colour space. The tone mapping algorithm may for example provide a mapping between input intensity values and output intensity values, and/or input chrominance values and output chrominance values. The relationship is determined by various parameters of the algorithm. These parameters may be adjusted in order to obtain a particular visual effect and/or to map the input dynamic range to a particular output dynamic range. FIG. 3 illustrates a simplified tone mapping algorithm TMA wherein input intensities $I_{in}$ are mapped to output intensities $I_{out}$. Using the example of FIG. 3, various parameters of a non-linear function may for example be used to control the way in which input intensities $I_{in}$ in FIG. 3 are mapped to the output intensities $I_{out}$. In other words, the parameters affect the shape of the graph in FIG. 3. By changing the parameters, the shape of the graph in FIG. 3 is adjusted, consequently changing the way in which the input intensities are mapped to the output intensities. Other tone mapping parameters such as contrast, colour saturation, gamma and so forth may be used in more complex tone mapping algorithms to likewise control the way in which input image data values are mapped to output image data values.

In the generating step in the above method, the sparse image data is used to generate tone mapping parameters of a tone mapping algorithm TMA for the sparsely distributed positions $Pos_{1\ldots k}$ in the image as well as for further positions $PosF_{1\ldots j}$ in the image. The sparse image intensity data is therefore used to set the tone mapping parameters at other positions in the image. With reference to FIG. 2, one example implementation may for instance include computing a weighted average of the pixel intensity values at sparsely-distributed position $Pos_1$ in the image; and using the weighted average to set the tone mapping parameters, i.e. to determine the shape of a function relating input pixel intensity $I_{in}$ to output intensity $I_{out}$ as in FIG. 3; and using these tone mapping parameters, i.e. the same shape of the function to map the pixel intensities at the sparse position $Pos_1$ as well as the pixel intensities at a further position $PosF_1$ in the image. For instance, if the weighted average of the pixel intensity values at sparsely-distributed position $Pos_1$ had a high value, then the pixel intensities at the further position $PosF_1$ might be mapped using the tone mapping algorithm in FIG. 3 with its indicated shape, whereas if the weighted average of the pixel intensity values at sparsely-distributed position $Pos_1$ had a low value, a flatter-shaped curve might be used. Computing a weighted average of the pixel intensity values at sparsely-distributed position $Pos_1$ in the image may optionally include generating one or more histograms for each of the sparsely distributed positions $Pos_{1\ldots k}$ in the image.

The further positions $PosF_{1\ldots j}$ in each image may represent the complement of the sparsely distributed positions $Pos_{1\ldots k}$ in the image. The further positions $PosF_{1\ldots j}$ may alternatively represent a subset of the complement of the sparsely distributed positions in the image. As mentioned above, each position may correspond to one or more pixels, and each pixel may optionally include a plurality of sub-pixels.

Figure 4:
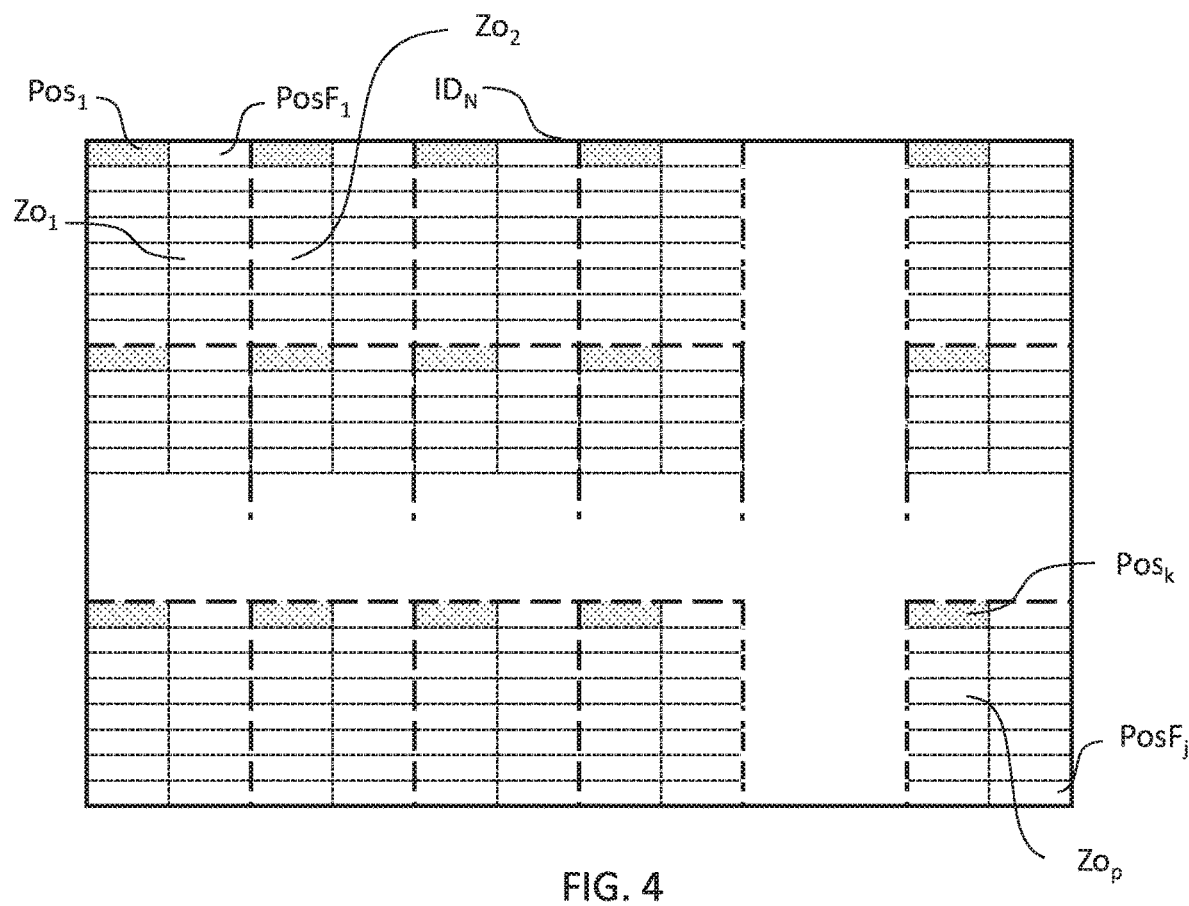
FIG. 4 illustrates image data $ID_N$ corresponding to an image $Fr_N$ that is divided into zones $Zo_{1 \ldots p}$.

In some implementations each image in the stream of images may optionally be divided into zones and common tone mapping parameters applied to each zone. Thereto, FIG. 4 illustrates image data $ID_N$ corresponding to an image $Fr_N$ that is divided into zones $Zo_{1\ldots p}$. In these implementations the above step of: generating, based on the sparse image data, tone mapping parameters of a tone mapping algorithm TMA for each position in the image $Fr_N$ includes:

dividing the image $Fr_N$ into a plurality of zones $Zo_{1\ldots p}$; and for each zone $Zo_{1\ldots p}$, using the sparse image data from the one or more sparsely distributed positions within the zone $Zo_{1\ldots p}$ to generate common tone mapping parameters of the tone mapping algorithm for the sparsely distributed positions $Pos_{1\ldots k}$ and the further positions $PosF_{1\ldots j}$ within the zone.

Dividing the image into zones in this manner helps to relax the processing requirements of the tone mapping method because the sparsely distributed positions and the further positions within each zone use common tone mapping parameters.

In FIG. 4, each zone $Zo_{1\ldots p}$ is bounded by long-dashed lines, and in each zone, for example zone $Zo_1$, is a sparsely-distributed position $Pos_1$. Position $Pos_1$ may as described above include one or more pixels or sub-pixels, each having an intensity value and/or a chrominance value. Using this example, the intensity value(s) and/or chrominance value(s) of the pixel(s) at position $Pos_1$ may be used to generate common tone mapping parameters of the tone mapping algorithm for all pixels within the zone; i.e. the pixel(s) at sparsely distributed positions $Pos_1$, as well as the pixel(s) at further positions $PosF_1$ within zone $Zo_1$. Each zone $Zo_{1\ldots p}$ may optionally include multiple sparsely distributed positions $Pos_{1\ldots k}$; the sparse image data from the multiple sparsely distributed positions $Pos_{1\ldots k}$ being used to generate the common tone mapping parameters of the tone mapping algorithm for all pixels within the zone. In so doing, each zone may therefore be mapped with a tone mapping algorithm that is particularly suited to the zone. One zone in the image may for example include regions of high intensity white pixels such as clouds or bright lights, and all pixels within this zone would be tone mapped using a common tone mapping algorithm that is determined based on the sparse image data in the zone. Aesthetically pleasing images may be provided by adjusting the number of zones and the number of sparsely distributed positions in each image. Thus, it is contemplated to use alternative zones to those in FIG. 4, and these zones may have a different size and/or shape to those in the illustrated example.

The above step of: for each zone $Zo_{1\ldots p}$, using the sparse image data from the one or more sparsely distributed positions within the zone $Zo_{1\ldots p}$ to generate common tone mapping parameters of the tone mapping algorithm for the sparsely distributed positions $Pos_{1\ldots k}$ and the further positions $PosF_{1\ldots j}$ within the zone may optionally also include: for adjacent zones, filtering the generated tone mapping parameters. The filtering may help to smoothen the appearance of images that are tone mapped in this manner.

Returning to FIG. 1; having generated tone mapping parameters of a tone mapping algorithm TMA for each position in the image, the method of the present disclosure continues with the step of:

reading the image data values $ID_N$ corresponding to the image $Fr_N$ to provide image data from each position in the image $Fr_N$.

This is illustrated in FIG. 1 by the step Full frame pixel fetch. Here, the image data values; i.e. the intensity values and/or chrominance values are read for the entire image. As indicated in FIG. 1, these image data values may be read from the same memory that was partially read during the Sparse read step.

The method of the present disclosure then continues with the step of:

tone mapping the image by mapping the image data from each position in the image $Fr_N$ to adjusted image data using the generated tone mapping parameters.

Here the intensity values and/or chrominance values of the sparsely-distributed positions in the image $Pos_{1...k}$ and the further positions $Pos_{1...j}$ in the image are mapped to adjusted intensity and/or chrominance values. Optionally the method may further include a step of displaying the image. The adjusted image data may for example be displayed live, i.e. quasi real-time. Alternatively the image may be stored in a memory for display at a later point in time. Thus, the tone mapping step may also include a step of storing the adjusted image data to a memory. The memory may be a short term memory such as an output image buffer, or a long term memory such as a disk drive and so forth.

These method steps are then repeated for the subsequent image in the image stream, as illustrated for image $Fr_N$ in the image stream in FIG. 1.

In order to make efficient usage of time, in some implementations the Sparse read step described above may optionally take place during a vertical blanking interval. This is illustrated with reference to FIG. 1. Conventionally, images from an image stream are displayed sequentially by updating lines of pixels in a display. After all the lines of a particular image, e.g. image $Fr_1$, have been updated, there is a pause termed a "vertical blanking interval" before the display is updated with the lines of pixels of a subsequent image in the stream. In FIG. 1, the vertical blanking interval is indicated by label VBI, and the time period during which the lines in image $Fr_N$ are updated is indicated by label Out Frame$_N$. The period $T_{Frame}$ is the time allocated to the display of each image in the stream and is determined by the sum of the durations of the periods VBI and Out $Fr_N$.

In order to make efficient use of time, the method of the present disclosure may optionally include:

generating display line update signals for displaying the image $Fr_N$; and wherein a time period between generating display line update signals for a last line of an image $Fr_{N-1}$ in the stream and generating display line update signals for a first line of a subsequent image $Fr_N$ in the stream defines a vertical blanking interval VBI;

and wherein: sparsely reading image data values $ID_N$ corresponding to the image $Fr_N$ to provide sparse image data from a plurality of sparsely distributed positions $Pos_{1...k}$ in the image $Fr_N$, is performed for the image $Fr_N$ during the vertical blanking interval VBI that precedes: generating display line update signals for displaying the image $Fr_N$.

Sparsely reading the image data values during the vertical blanking interval that precedes an image makes efficient use of time since it ensures that the image data values are available for use when later updating the image.

The sparse image intensity data may optionally also be filtered during the VBI in order to make even more efficient use of time. This filtering may for instance include computing a weighted average of the (sub-)pixel intensity values at each of the sparsely distributed positions $Pos_{1...k}$ during the VBI.

Optionally, the step of: generating, based on the sparse image data, tone mapping parameters of a tone mapping algorithm TMA for each position in the image $Fr_N$; each position in the image $Fr_N$ including the sparsely distributed positions $Pos_{1...k}$ and a plurality of further positions $PosF_{1...j}$ in the image $Fr_N$; may be performed for the image $Fr_N$ during the vertical blanking interval VBI that precedes: generating display line update signals for displaying the image $Fr_N$. This ensures that the generated tone mapping parameters are available for use when later reading and tone mapping the image data for the entire image frame.

The above-described method may be carried out by a system that includes a processor and a memory, the processor being in communication with the memory. The memory includes instructions which when executed on the memory cause the memory to carry out the method.

The above-described method may also be provided in the form of a non-transitory computer-readable storage medium comprising a set of computer-readable instructions stored thereon which, when executed by at least one processor, cause the at least one processor to perform the method.

The above-described method may also be provided in the form of a computer program product comprising instructions which when executed by a processor, cause the processor to carry out the method.

The non-transitory computer-readable storage medium or computer program product may be provided by dedicated hardware or hardware capable of running the software in association with appropriate software. When provided by a processor, these functions can be provided by a single dedicated processor, a single shared processor, or multiple individual processors that some of the processors can share. Moreover, the explicit use of the terms "processor" or "controller" should not be interpreted as exclusively referring to hardware capable of running software, and can implicitly include, but is not limited to, digital signal processor "DSP" hardware, read only memory "ROM" for storing software, random access memory "RAM", nonvolatile storage device, and the like. Furthermore, embodiments can take the form of a computer program product accessible from a computer usable storage medium or a computer readable storage medium, the computer program product providing program code for use by or in connection with a computer or any instruction execution system. For the purposes of this description, a computer-usable storage medium or computer-readable storage medium can be any apparatus that can comprise, store, communicate, propagate, or transport a program for use by or in connection with an instruction execution system, apparatus, or device. The medium can be an electronic, magnetic, optical, electromagnetic, infrared, or semiconductor system or device or device or propagation medium. Examples of computer readable media include semiconductor or solid state memories, magnetic tape, removable computer disks, random access memory "RAM", read only memory "ROM", rigid magnetic disks, and optical disks. Current examples of optical disks include compact disk-read only memory "CD-ROM", optical disk-read/write "CD-R/W", Blu-Ray™, and DVD.

The above embodiments are to be understood as illustrative examples of the present disclosure. Further embodiments of the present disclosure are envisaged. For example, it is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the present disclosure, which is defined in the accompanying claims.

What is claimed is:

1. A method of performing tone mapping in a stream of images ($Fr_{1 \ldots N}$), the method comprising, for each image ($Fr_N$) in the stream:
   sparsely reading image data values ($ID_N$) corresponding to the image ($Fr_N$) to provide sparse image data from a plurality of sparsely distributed positions ($Pos_{1 \ldots k}$) in the image ($Fr_N$);
   generating, based on the sparse image data, tone mapping parameters of a tone mapping algorithm (TMA) for each position in the image ($Fr_N$); each position in the image ($Fr_N$) including the sparsely distributed positions ($Pos_{1 \ldots k}$) and a plurality of further positions ($PosF_{1 \ldots j}$) in the image ($Fr_N$);
   reading the image data values ($ID_N$) corresponding to the image ($Fr_N$) to provide image data from each position in the image ($Fr_N$); and
   tone mapping the image by mapping the image data from each position in the image ($Fr_N$) to adjusted image data using the generated tone mapping parameters.

2. The method according to claim 1, wherein: generating, based on the sparse image data, tone mapping parameters of a tone mapping algorithm (TMA) for each position in the image ($Fr_N$), comprises:
   dividing the image ($Fr_N$) into a plurality of zones ($Zo_{1 \ldots p}$); and
   for each zone ($Zo_{1 \ldots p}$), using the sparse image data from the one or more sparsely distributed positions within the zone ($Zo_{1 \ldots p}$) to generate common tone mapping parameters of the tone mapping algorithm for the sparsely distributed positions ($Pos_{1 \ldots k}$) and the further positions ($PosF_{1 \ldots j}$) within the zone.

3. The method according to claim 1, wherein each image ($Fr_N$) in the stream of images ($Fr_{1 \ldots N}$) comprises a plurality of pixels ($Px_{1 \ldots M}$);
   wherein each position in the image comprises a single pixel or a group of pixels; and
   wherein the image data values ($ID_N$) comprise intensity values and/or chrominance values of the one or more pixels.

4. The method according to claim 3, wherein each pixel ($Px_{1 \ldots M}$) includes a plurality of sub-pixels, each sub-pixel having a sub-pixel intensity value; and wherein the intensity value at each position in the image ($Fr_N$) comprises a weighted average of the plurality of sub-pixel intensity values at said position.

5. The method according to claim 1 further comprising:
   generating display line update signals for displaying the image ($Fr_N$); and
   wherein a time period between generating display line update signals for a last line of an image ($Fr_{N-1}$) in the stream and generating display line update signals for a first line of a subsequent image ($Fr_N$) in the stream defines a vertical blanking interval (VBI);
   and wherein: sparsely reading image data values ($ID_N$) corresponding to the image ($Fr_N$) to provide sparse image data from a plurality of sparsely distributed positions ($Pos_{1 \ldots k}$) in the image ($Fr_N$), is performed for the image ($Fr_N$) during the vertical blanking interval (VBI) that precedes: generating display line update signals for displaying the image ($Fr_N$).

6. The method according to claim 1 wherein: sparsely reading image data values ($ID_N$) corresponding to the image ($Fr_N$) to provide sparse image data from a plurality of sparsely distributed positions ($Pos_{1 \ldots k}$) in the image ($Fr_N$), further comprises filtering the sparse image data.

7. The method according to claim 1 further comprising displaying the image ($Fr_N$).

8. The method according to claim 1 wherein: sparsely reading image data values ($ID_N$) corresponding to the image ($Fr_N$) to provide sparse image data from a plurality of sparsely distributed positions ($Pos_{1 \ldots k}$) in the image ($Fr_N$), comprises sparsely reading a memory comprising said data values ($ID_N$); and/or
   wherein reading the image data values ($ID_N$) corresponding to the image ($Fr_N$) to provide image data from each position in the image ($Fr_N$), comprises reading a memory comprising said data values ($ID_N$).

9. The method according to claim 1 wherein the sparse image data provided by: sparsely reading image data values ($ID_N$) corresponding to the image ($Fr_N$) to provide sparse image data from a plurality of sparsely distributed positions ($Pos_{1 \ldots k}$) in the image ($Fr_N$), represents a proper subset of the image data of each image ($Fr_N$).

10. The method according to claim 1 further comprising storing the sparsely read image data.

11. The method according to claim 1, wherein the sparse image data from adjacent sparsely distributed positions in the image ($Fr_N$) corresponds to non-overlapping regions in the image ($Fr_N$).

12. System comprising a processor and a memory;
    wherein the processor is in communication with the memory;
    and wherein the memory comprises instructions which when executed on the memory cause the memory to carry out the method according to claim 1.

13. The system according to claim 12 wherein the memory comprises a direct memory access memory;
    and wherein: sparsely reading image data values ($ID_N$) corresponding to the image ($Fr_N$) to provide sparse image data from a plurality of sparsely distributed positions ($Pos_{1 \ldots k}$) in the image ($Fr_N$), comprises: storing the sparse image data in the direct random access memory.

14. The system according to claim 12 wherein the memory comprises a frame buffer; and wherein: sparsely reading image data values ($ID_N$) corresponding to the image ($Fr_N$) to provide sparse image data from a plurality of sparsely distributed positions ($Pos_{1 \ldots k}$) in the image ($Fr_N$), comprises: storing the sparse image data to the frame buffer.

15. A non-transitory computer-readable storage medium comprising a set of computer-readable instructions stored thereon which, when executed by at least one processor, cause the at least one processor to perform the method according to claim 1.

* * * * *